United States Patent [19]

Gewin et al.

[11] Patent Number: 5,060,226
[45] Date of Patent: Oct. 22, 1991

[54] TELECOMMUNICATIONS NETWORK TEST SYSTEM

[75] Inventors: Robert E. Gewin, Huntsville; Gary L. Aderholt, Athens, both of Ala.

[73] Assignee: Phoenix Microsystems, Inc., Huntsville, Ala.

[21] Appl. No.: 548,675

[22] Filed: Jul. 5, 1990

[51] Int. Cl.[5] .................. H04J 1/16; G06F 11/00; H04M 1/24
[52] U.S. Cl. .................................. 370/15; 379/5; 371/20.5
[58] Field of Search .................. 370/15, 13, 14, 16, 370/16.1; 371/19, 20.5; 379/5

[56] References Cited

U.S. PATENT DOCUMENTS

| | | | |
|---|---|---|---|
| 4,551,830 | 11/1985 | Huffman | 370/15 |
| 4,584,677 | 4/1986 | Kosaka | 370/15 |
| 4,686,668 | 8/1987 | Koseki et al. | 370/15 |
| 4,704,714 | 11/1987 | Tomizawa et al. | 370/15 |
| 4,766,594 | 8/1988 | Ogawa et al. | 370/20.5 |
| 4,855,993 | 8/1989 | Hamada et al. | 370/15 |
| 4,930,119 | 5/1990 | Kobayashi et al. | 370/16.1 |

Primary Examiner—Douglas W. Olms
Assistant Examiner—H. Kizou
Attorney, Agent, or Firm—Philips & Beumer

[57] ABSTRACT

A telecommunications line test system wherein a digital telecommunications network is electronically sectionalized via at least one master test unit in combination with at least one remotely addressable field loopback unit whereby the defective line section is isolated by progressively looping back test data as transmitted from a master test unit. Each field loopback unit, when properly addressed, will loopback to both the near side and the far side of the line so as to enable a given loopback unit to be reset (inactivated) from either side of the line.

5 Claims, 3 Drawing Sheets

TELECOMMUNICATIONS NETWORK TEST SYSTEM

FIELD OF THE INVENTION

This invention relates generally to telecommunication transmission networks and particularly to a test system which employs an addressable loopback test method to sectionalize and isolate faults within a digital telecommunications network.

BACKGROUND OF THE INVENTION

In the telecommunications industry, trouble-shooting of failed networks by sectionalization is well established. The test method commonly employed is known as the loopback method wherein various nodes or points along a network are equipped with remote units which can provide test data received from a test unit back to the test unit, echoing or looping back transmitted test data. Typically, these field units are normally dormant (transparent) on the line and are only activated in response to local manual selection or, alternately, by remotely transmitted unique dress codes. The nodes are successively looped and tested to sectionalize failures. Some past loopback approaches, such as those of U.S. Pat. Nos. 3,943,305 and 4,582,964, have implemented this concept in a manner which has significance only with respect to conventional analog telephone lines. The method of U.S. Pat. No. 3,943,305 utilizes analog alternating current tone pulses which are decoded to generate an enabling device address. U.S. Pat. No. 4,582,964 expands further on this concept, using additional tone signals to control the main central transmitting unit as a means to remotely select the desired test route.

With respect to digital telecommunication networks, the conventional addressing approach has been to send a unique five-bit code (which contains an embedded device address) to the selected loopback device. A loopback unit is located at each node or test point in the network. When a selected loopback unit receives its own unique activation address, it will responsively loopback all data it receives. The fault is isolated to a particular segment of the line when the transmitting test unit receives the looped-back data and performs a comparison. If a particular line segment is determined to be functioning properly, a reset code is sent to disconnect from the line the test unit located at the end of the good line segment. The next line segment is then looped and tested in an identical manner. This process is repeated until the fault is isolated.

There are several difficulties with the current approach. Most significantly, the utilization of the present industry standard five-bit code imposes severe restrictions on the number of loopback units or other devices which may be employed on a given segment of a network. To optimize testability, every node in the network should provide remote loopback. This requires the generation of a unique device address for each loopback unit located within the network. A five-bit address is limited to addressing a maximum of $2^5$, or 32 unique addresses. However, due to certain industry usage restrictions, the industry standard five-bit code is in practice only capable of providing six unique codes for remote loopback device addresses. While the format for sending the five-bit code is well defined throughout the industry, only a few of the available codes are standardized with regard to conveying a specific meaning. The limited number of nodes which can be addressed by a five-bit code is insufficient with respect to most telecommunication networks. In actual practice, the present approach is only capable of testing from one end of a line to the other end of a line, that is, it is incapable of looping at intermediate points along the line. Furthermore, the applicant is unaware of any similar system which has the capability of looping at such intermediate points along the line.

Second, it is imperative to accurately and reliably distinguish between transmitted test data and actual live customer data, even though line tests are typically performed with the line out of service. This is essential in order to prevent inadvertent activation of a dormant test device by live customer data. A more secure and reliable method of addressing dormant loopback or other devices on line would be highly desirable.

Lastly, if a particular line segment is found to be defective, there is often no remote means available to deactivate (reset) a locked-up loopback unit, that is, if the line is intermittently bad, a given loopback unit may receive its activation address code and initiate loopback but may not be able to receive its deactivation reset code. In such conditions, aside from a manual field reset, the line will remain in loopback. Therefore, it would be highly desirable if the loopback were performed simultaneously from both the near and far sides of the line with respect to a given loopback unit. This would enable a given loopback unit to be remotely deactivated (reset), if necessary, from the remaining side of the line that is presumably functional. Additionally, with such a simultaneous near and far side loopback, two line segments could be tested at the same time.

It is, accordingly, the object of the present invention to overcome such prior art deficiencies as stated above and to provide an improved digital telecommunications network test system.

SUMMARY OF THE INVENTION

In accordance with this invention, a master test unit capable of sending and receiving test data is configured at a selected point within the network in combination with a plurality of remotely addressable field loopback units, also located at selected points within the network. In an alternative configuration, two master units may be located on the near and far sides, respectively, of a given loopback unit. Testing is only performed with the line out of service, although individual loopback units remain electrically connected to the line at all times. Upon power-up, and prior to a first addressing event, all loopback units are initially configured in the dormant (reset) mode where they appear transparent to all customer telecommunications activity. To initiate a line test, an odd-bit-length, 11-bit address code is transmitted by a master test unit at selectively timed regular intervals to all remote units located along the line. This incorporation of an odd 11-bit word as an addressing means provides a most unusual sync pattern which is readily detected and synced to by all remote loopback units on line. A given selected loopback unit will activate only if the four following conditions are completely satisfied. First, it must receive a binary word of exactly 11-bits in length. Second, the 11-bit word must repeat at the selected sync frequency. Any binary word of 11 bits in length which is also received at the proper sync interval is considered to be an address candidate.

Third, a loopback unit will then compare six selected bit positions of the received 11-bit word with its own user-assigned, unique, 6-bit device address (remote unit device addresses are set manually by a dip switch configured on each unit). Fourth, if such comparison indicates a matching address, a timer is activated, which must further time a minimum of 4.5 seconds of successive address matches. When a field unit is activated, it assumes the loopback mode wherein all data received is echoed back to the transmitting master test unit. This loopback occurs in parallel on both the near and far sides of a given loopback unit; thus, it is possible to simultaneously test the line on both sides of a given loopback unit, provided there is present an additional master test unit located at the far side of the given loopback unit. Significantly, this provides the capability to effect a remote reset from the far side of the remote unit should the near side of the line become inoperative after a loopback has been initiated. A reset code, when received from either side of the network, will deactivate the remote unit, terminating the loopback. Before the loopback device is reset, a standard B.E.R.T. (Bit Error Rate Test) is conducted to determine the operative status of the line. If a given line segment is found to be functional, a reset code is sent to disable the loopback unit at the end of the operative line so as to enable the testing of the next line segment. This successive line segment will also be configured with a terminating loopback unit which is subsequently addressed and activated. Successive line segments are tested in an identical manner. This process is repeated until the fault is isolated.

DETAILED DESCRIPTION OF THE DRAWINGS

Figure 1A:
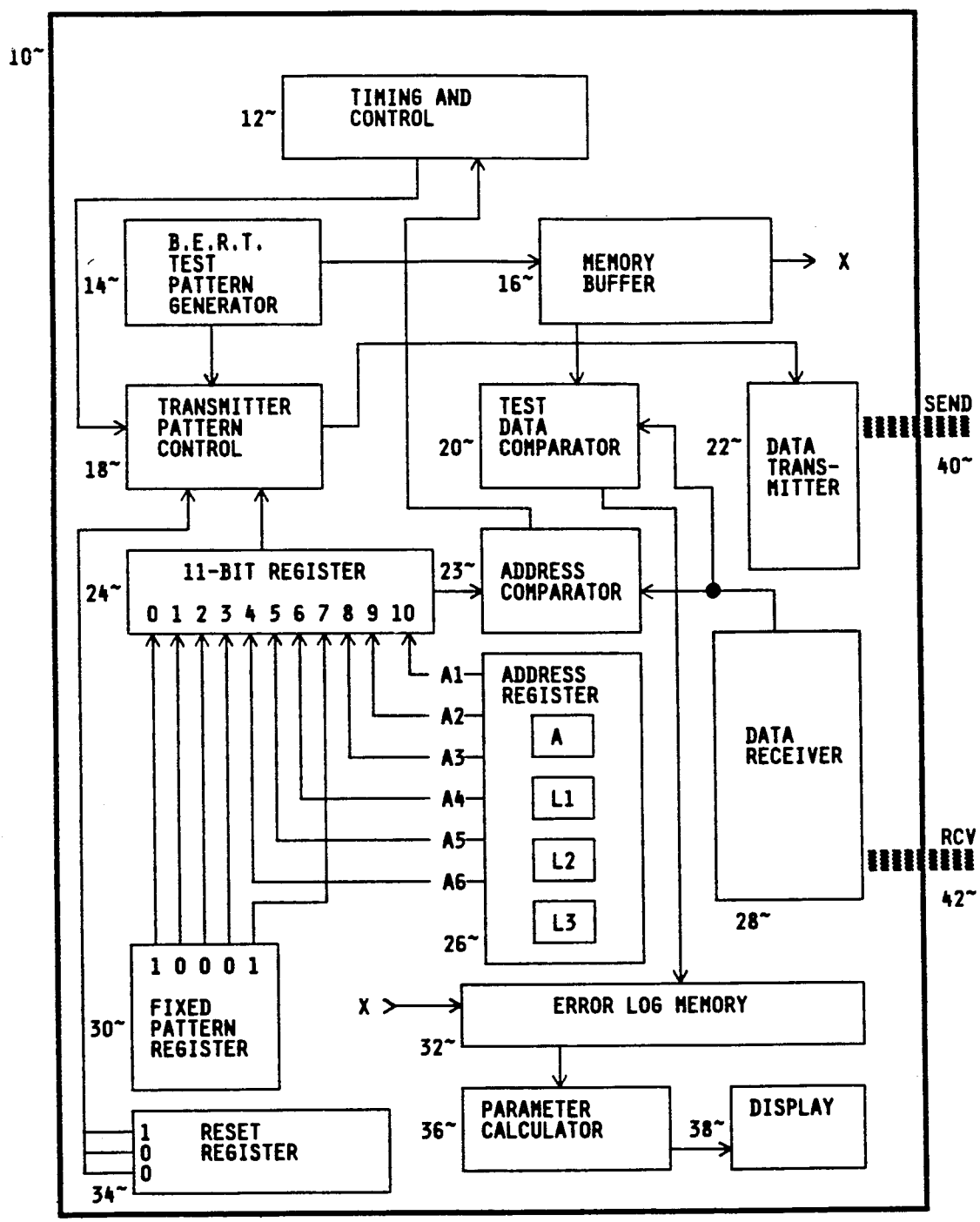
FIG. 1A is a block diagram of the preferred embodiment of a master test unit of the present invention.
Figure 1B:
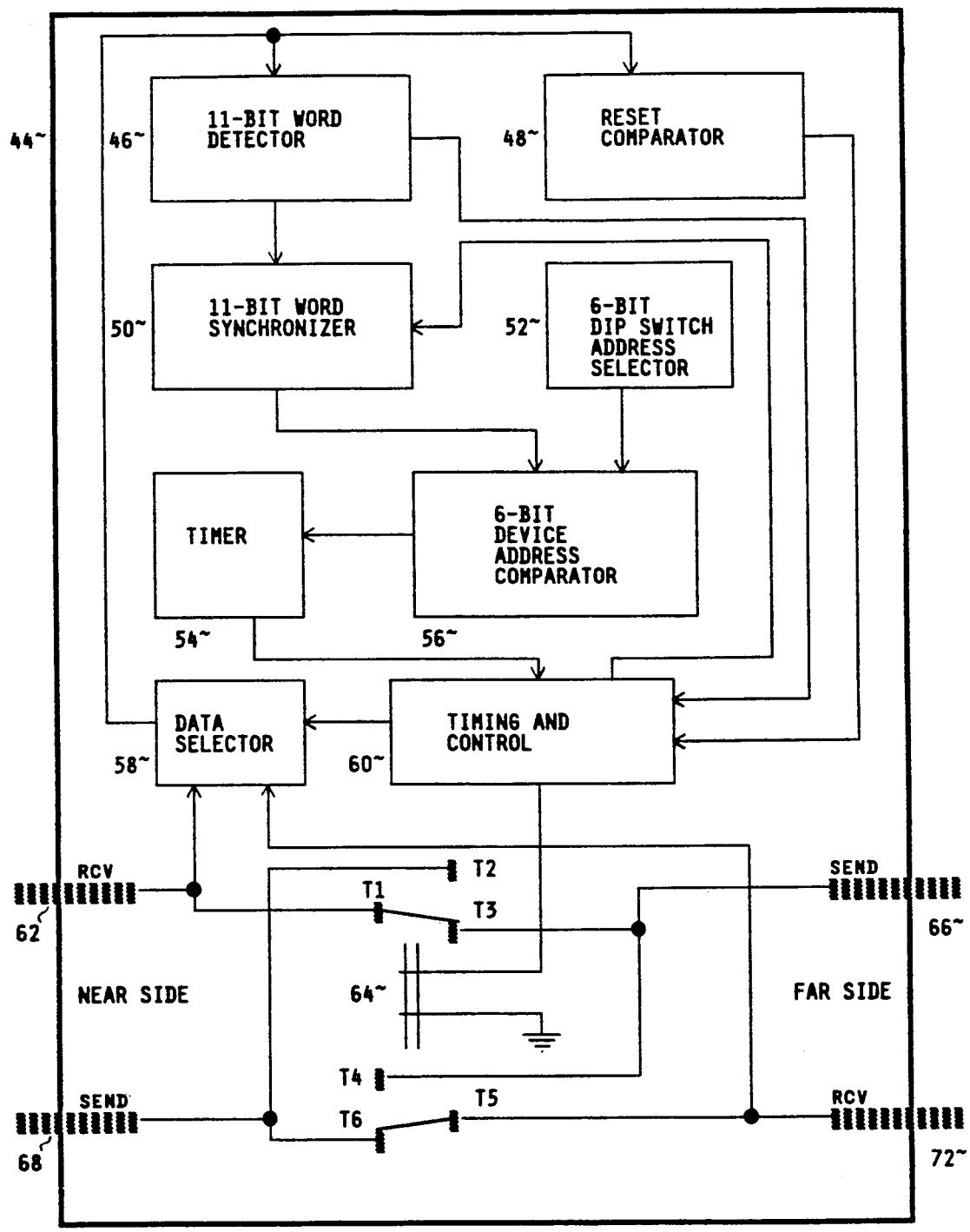
FIG. 1B is a block diagram of the preferred embodiment of a remote field loopback unit of the present invention.

Corrupted data and/or sync losses have been reported on a telecommunications network conveying binary data. In order to restore error-free operation of a particular digital telecommunications line thereof, the failing element(s) or defective segment(s) on the line must be identified. Referring to FIGS. 1A and 1B, showing master test unit 10, this identification is accomplished by progressively sectionalizing the network wherein a repeating 11-bit address is transmitted by master test unit 10 to a selected loopback remote unit 44 (FIGS. 1B, 2, and 3) located somewhere along the line. A series of these remote units 44 may be located at selected points within the network. Once properly addressed, remote unit 44 will loopback all test data as transmitted by master test unit 10. In this loopback mode, all the test data echoed back to master unit 10 is compared and analyzed for errors using established B.E.R.T. (Bit Error Rate Test) techniques. If a particular line segment is determined to be functioning properly, a reset code is sent to deactivate the remote unit at the end of the functional line. The next loopback unit on the line is then addressed, and an additional loopback test is subsequently performed. Successive line segments are tested in an identical manner. This process is repeated until a fault is isolated. It is noted that each remote unit, when in the loopback mode, will provide a full duplex loopback function on both sides of the remote unit.

Figure 3:
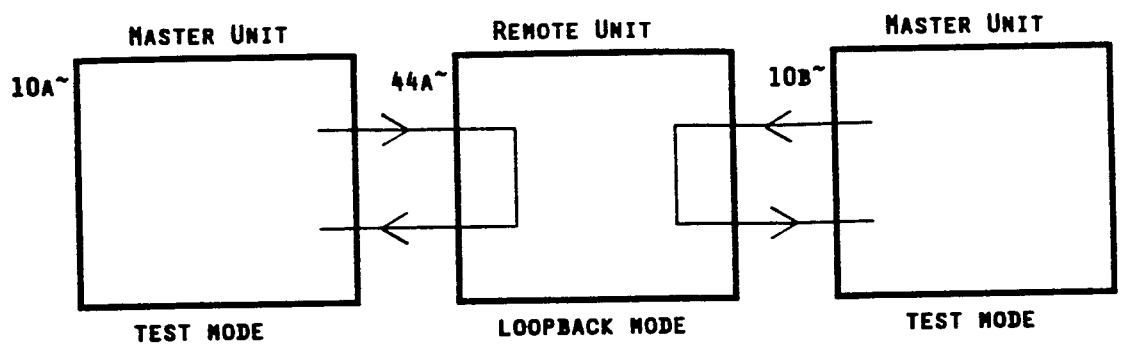
FIG. 3 is a block diagram of a second configuration of the system of the present invention.

In the special circumstance wherein remote unit 44 has been activated but, due to an intermittent line condition, cannot otherwise be remotely deactivated, the simultaneous loopback of both the near and the far sides of the line provides a means to deactivate the unit by utilizing the remaining, presumed good, side of the line. A reset code is transmitted by a master unit 10 over the remaining, presumed functional, line, and thereby remote loopback unit 44 is effectively deactivated (reset). In such situations, paired master units as shown in FIG. 3 are always required, one on either side of a given loopback unit. If a line segment on one side of a remote unit is completely bad, the only way a loopback unit can be remotely reset is by the other master unit. However, if both sides of the line are bad, a manual field reset will be required.

Any alternative code implemented as a means to overcome the inherent limitations of the industry standard five-bit code must satisfy two industry mandated requirements. The first restriction is that the address and test code must be differentiated from the customer data stream in some manner. Second, in accordance with the requirements of a standard 1.544 Mbps T1 transmission link, with which this system may be used, there must be N ones in each interval of 8(N+1) bits, where N varies from 1 to 24.

The transmitted address codes of the present invention satisfy the first requirement in two ways. First, the address code is made distinct from the customer data stream by implementing an unusual, odd length, binary word comprised of 11 bits, as stored in 11-bit register 24 (FIG. 1A). This contrasts with the even (8, 16, 32, 64 being typical) bit word length of the customer data stream. Additionally, this 11-bit pattern is transmitted repeatedly for a selected duration, e.g., of at least four and one-half seconds. Accordingly, for a given dormant loopback device to be enabled, it must not only receive the exact sequence of serial bits which correspond to its device address but, significantly, the address must appear in the distinct format of an odd-length, 11-bit word; and furthermore, the odd-word length address must persist for the minimum of 4.5 seconds. These combined approaches virtually eliminate the possibility that live customer data will inadvertently activate a dormant field loopback device.

The second industry mandated one's density restriction is satisfied by fixing the zero, first, second, third, and seventh bit positions in the serial data stream, with the zero bit being defined as the first bit transmitted. Referring to FIG. 1A, fixed pattern register 30 illustrates these constant bits. The exact 11-bit address format transmitted by data transmitter 22 is detailed as follows:

| Time → | | | | | | | | | | | |
|---|---|---|---|---|---|---|---|---|---|---|---|
| Bit Positions | 0 | 1 | 2 | 3 | 4 | 5 | 6 | 7 | 8 | 9 | 10 |
| Data | 1 | 0 | 0 | 0 | A6 | A5 | A4 | 1 | A3 | A2 | A1 |

There is reserved six user-selectable bits in serial bit positions 4, 5, 6, 8, 9, and 10 of the 11-bit word. Most significantly, these six user selectable bits provide for 64 possible unique device addresses. These six bits are stored within address register 26, as shown. As an option, automated selection of a series of loopback unit addresses (L1, L2, L3, ..., LN) is possible, as pointed to (selected) by address pointer A, which is a register sequentially updated with the address of the loopback device to be selected next and as illustrated within the block of address register 26. Automated selection is performed by timing and control unit 12 which is coupled to address pointer A for this special optional case. Timing and control unit 12 provides means to increment address pointer A, which in turn points to and thus selects loopback addresses L1, L2, L3, etc., LN. With automated address selection, it is possible to address and test a selected succession of communication links without manual intervention. Alternately, selected bits of the six address bits provided by address register 26 may be used to select the operating mode, or function, of a multi-function test device once it has been initially addressed. As a further option, the six-bit code provided by address register 26 may be alternately used for remotely assigning device addresses, in a sequential manner, to all test devices present on the line as an initialization sequence. In a normal mode of operation, such device addresses are fixed by a conventional dip switch located on each remote unit.

Referring to FIG. 1A, several discrete devices are employed to assemble the desired 11-bit word. Fixed pattern register 30 holds the constant binary pattern '10001' which is placed in input bit positions 0, 1, 2, 3, and 7 of 11-bit register 24. This fixed pattern ensures that the actual composition of the 11-bit code will meet the one's density requirement, as described above. Additionally, this fixed pattern provides a framing pattern so that receiving loopback unit 44 (FIG. 1B) can recognize the 11-bit code and deframe the correct address information. Address register 26 (FIG. 1A) contains six address bits which are placed in bit positions 10, 9, 8, 6, 5, and 4 of 11-bit register 24, as shown. The six address bits supplied from address registers 26 and the five bits supplied from fixed pattern register 30 are combined to form a complete 11-bit address word which is stored in 11-bit register 24.

The 11-bit address code contained in 11-bit register 24 is further supplied as an input to transmitter pattern control unit 18. Pattern control unit 18 is a conventional data selector which switches and supplies the source of the data to the input of data transmitter 22. The data switching function of pattern control unit 18 is controlled by a control signal that is supplied from timing and control unit 12, as illustrated. Timing and control unit 12 is a conventional microprocessor controller. The control signal provided by timing and control unit 12 effectively selects between three data sources that are supplied as inputs to transmitter pattern control unit 18. These are as follows: an 11-bit address as supplied from 11-bit register 24, a reset code (001) as supplied from 3-bit reset register 34, and actual test data as supplied by B.E.R.T. test pattern generator 14. Data transmitter 22 is the actual line driver interface to the T1 line and serves to transmit all data supplied to it at 1.544 Mbps. Data transmitter 22 provides the line voltage levels or transitions as required to transmit the address and test data in a serial format at the aforementioned baud rate, as specified by the industry standard T1 protocol.

Processing at remote unit 44 (FIG. 1B) begins when data transmitter 22 (FIG. 1A) initiates transmission of an 11-bit word. The unusual, odd bit length word is synced to and detected by 11-bit detector 46 and 11-bit synchronizer 50, respectively. Eleven-bit detector 46 discerns when a binary word of exactly 11 bits in length has been received and provides as a first output a control signal coupled through timing and control unit 60 to data selector 58. Data selector 58 switches or interrogates rapidly between input signal 62 and input signal 72, providing for the monitoring of both the near and far sides of the line, as shown. The control signal provided by 11-bit word detector 46 assumes an active state whenever an 11-bit word has been detected. This control, coupled through timing and control unit 60, causes data selector 58 to select either input signal 62 or input signal 72, wherein the 11-bit word originated. A second output of detector 46 provides to 11-bit word synchronizer 50 all binary words of 11 bits in length received at the input of detector 46. Thus, only data in 11-bit binary word form is allowed to pass through to the input of synchronizer 50. Synchronizer 50 syncs in time to the expected occurrence of these 11-bit words, as controlled by timing and control unit 60, which is a conventional microprocessor control unit. Only 11-bit word inputs which occur at selected regular intervals are accepted as being a potential address word candidate. Properly synced word data, if detected, is fed from the output of synchronizer 50 to the input of comparator 56. In this manner, binary data which is not of correct 11-bit word length, and timing form is ignored. Conversely, all binary data that is of the correct 11-bit word length and further received at the proper selected sync rate is accepted and passed through to comparator 56 for a timed comparison, as will be explained.

The detected 11-bit word pattern is then further examined by comparator 56 for an embedded device address. Six-bit address comparator 56 examines the six selected bits of the 11 bits comprising the input word. These six bits are compared with the six-bit address that has been user selected with six-bit dip switch address selector 52. A repeating match that persists for a minimum of 0.5 seconds will cause data selector 58, as controlled by timing and control unit 60, to stay on the active line so as to enable six-bit address comparator 56 to verify an additional 4.0 seconds of repeating matching, as timed by timer 54. A correctly transmitted, matching, embedded device address that persists uninterrupted for a total of 4.5 seconds is considered to be a valid address to activate a loopback relay 64. This event will result in a responsive control signal which is fed from timer unit 54 to one input of timing and control unit 60. Timing and control unit 60 then provides the energizing potential to relay 64 to enable the loopback or activated mode.

In the loopback mode, relay 64 is activated, connecting first center terminal T1 to terminal T2 and simultaneously connecting second center terminal T5 to terminal T4. Connections of T1 and T2 couple near side signal input 62 to near side signal output 68, thus completing the loopback on one side of remote unit 44. Simultaneously, far side signal input 72 is connected through relay terminals T5 and T4 to far side signal output 66, thus completing the loopback on the second side of remote unit 44.

It is important to note that when remote unit 44 is latched in this loopback mode, all the data received by remote unit 44 from either direction is echoed or looped back in the direction it was received from (either the near or the far side of the line, as illustrated). All data is looped back to the respective sending device for error comparison and analysis.

The output of data selector 58 is further fed as an input signal to reset comparator 48. Reset comparator 48 will continuously test for a received reset code only when remote unit 44 is in the activated mode, that is, only when a test loopback is in progress. If a reset code is received from either signal input 62 or from signal input 72, as interrogated or polled by data selector 58, a control signal is fed from reset comparator 48 to an input of timing and control unit 60, which removes the energizing potential from relay 64. This terminates any loopback in progress and configures remote unit 44 in the inactive or reset mode wherein remote unit 44 becomes totally transparent to any customer data on the line.

In the reset mode, relay 64 is deactivated, switching first center terminal T1 to terminal T3 (as shown); and, simultaneously, second center terminal T5 is responsively switched and connected to terminal T6 (as shown). Configured as such, near side signal input 62, or customer data, is connected through relay terminals T1 and T3 to far side signal output 66, thus passing customer data 62 directly through to far side signal output 66. Simultaneously, far side signal input 72, also customer data, is connected through relay terminals T5 and T6 to near side signal output 68, thus passing customer data directly through to near side signal output 68.

The reset code is sent at any time during a loopback process when it is desired to reconfigure the remote device to the inactive or dormant mode. Data selector 58 alternates between "near side" and "far side" telecommunication lines, as described above, so the test sequence can therefore be initiated or terminated (by a reset code) at the Nth loopback remote unit from either end of the network. This capability provides means for resetting a unit via the remaining functional side of the network, as previously detailed. Additionally, a remote unit will automatically reset itself and assume an inactive or dormant mode upon power up.

Once the loopback mode has been established at remote unit 44, the transmitted address data stream is echoed back to master unit 10 through either signal output 68 or signal output 66 (depending on the exact test configuration) and is received by master unit 10 (referring to FIG. 1A) through signal input 42 by data receiver 28. Receiver 28 is a conventional T1 1.544 Mbps line receiver which converts the line voltages or transitions of the incoming serial bit stream into corresponding parallel data, whereby such incoming data may be more efficiently processed. The data output of receiver 28 is fed to one data input of address comparator 23 and also to one data input of test data comparator 20. A parallel output of 11-bit register 24 is fed as a second data input to address comparator 23. Address comparator 23 then performs a comparison, comparing the data received by receiver 28 with the transmitted address as supplied by 11-bit register 24. If a match is detected, this indicates a successful loopback, and a responsive control signal is supplied from the output of address comparator 23 to an input of timing and control unit 12, which further provides a responsive control signal to transmitter pattern control unit 18. This results in transmitter pattern control unit 18 switching its output by selecting B.E.R.T. test pattern generator 14 as the active data source. In this manner, the transmission of repeating 11-bit address codes by master unit 10 is discontinued, and the transmission test pattern, as provided by a standard B.E.R.T. test pattern generator 14, is initiated.

The test pattern is transmitted through transmitter pattern control unit 18 and over the T1 line by data transmitter 22 through signal output 40 and is looped-back by remote unit 44. It is subsequently received by data receiver 28 through signal input 42. At this time, test data comparator 20 compares the received data with test data stored in memory buffer 16, which is a conventional RAM memory unit. One data output of memory buffer 16 is supplied to one data input of comparator 20. Memory buffer 16 provides an exact duplicate of the test data that has just been transmitted by B.E.R.T. test pattern generator 14. Any discrepancy between the transmitted and received data is detected by data comparator 20, which provides as its output an enabling control signal to error log memory 32, which is a conventional RAM memory unit. A second data output of memory buffer 16 is fed to the data input of error log memory 32, as enabled by the control signal output of comparator 20. In this manner, all test data error events are stored for later user reference within error log memory 32. Additionally, numerous performance parameters are calculated by parameter calculator 36. Both the bit error history and the calculated performance parameters are available for user reference on display 38.

Once the performance of a particular line segment has been verified, transmitter pattern control unit 18 is directed by timing and control unit 12 to send a reset code (001) as stored in reset register 34. This reset code transmission is repeated for at least 5.0 seconds. The reset code will terminate the loopback, as previously detailed.

In summary, remote unit 44 will poll both sides of the T1 line listening for an activating, properly-timed address data stream whenever the remote unit is in the reset mode. Once addressed correctly and activated, remote unit 44 will poll both sides of the T1 line listening for a deactivating reset code. This provides the capability for detecting an address data stream or reset code which has been sent from either end of the T1 telecommunications link. Significantly, this precludes the possibility that a given remote unit might remain locked in the loopback mode as the result of an intermittently bad line preventing the reception of a remotely transmitted reset (deactivation) code.

Figure 2:
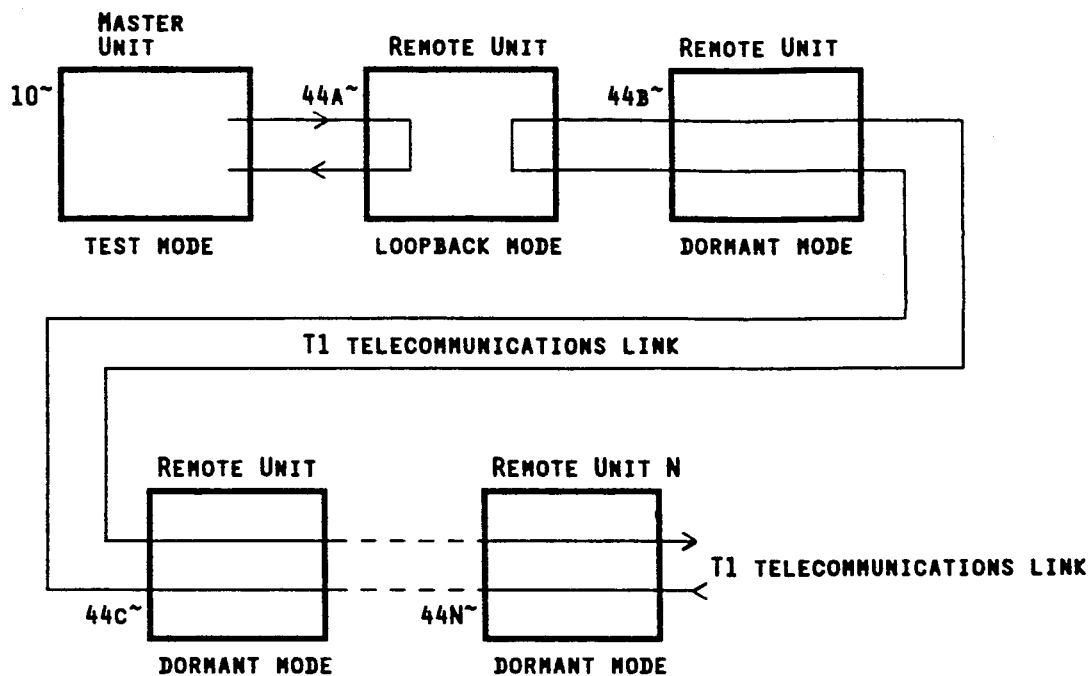
FIg. 2 is a block diagram of a first configuration of the system of the present invention.

A first configuration of the present invention is illustrated in FIG. 2 wherein successive line tests are performed by a single master unit. Master unit 10 will initially address remote unit 44A, thereby activating the loopback mode of remote unit 44A, as shown. The full duplex line connecting master unit 10 and remote unit 44A is then tested. If no errors are detected, a reset code is sent by master unit 10 to deactivate the loopback mode of remote unit 44A. Thus, remote unit 44A is reconfigured in the dormant, or deactivated, state where it becomes transparent on the line. Subsequently, master unit 10 addresses remote unit 44B, thereby activating remote unit 44B in the loopback mode. An identical line test is then performed by master unit 10. Again, if no errors are detected, remote unit 44B will be reset by master unit 10, and the next line segment will be tested in an identical manner. This process continues with remote units 44C, 44D, 44E, and until 44N, as necessary, until all faults are isolated. It is noted that in this first system configuration, only the loopback capability of one side of a given remote unit is utilized at one time.

A second configuration of the present invention is illustrated in FIG. 3 wherein a loopback to both sides of the line (with respect to a given loopback unit) is utilized, that is, two independent line tests are conducted by two master test units 10A and 10B working in combination with a given remote unit which is located between the master units somewhere along the line. As shown in FIG. 3, a first master test unit 10A will test the line on one side of remote unit 44A, and a second and like master test unit 10B will test the line on the other side of remote unit 44A. These tests may or may not be performed at the same time. The loopback mode of remote unit 44A may be activated by either master unit 10A or by master unit 10B, presuming the line is functional on both sides of remote unit 44A. Similarly, remote unit 44A may be deactivated (reset) by either master unit, again presuming both sides of the line are fully operative.

In the aforementioned manner, a digital telecommunications network can be tested for proper operation. Obviously, within the skill of the art, a binary word of any length can be used in a general manner to address and remotely enable a digitally controlled device. It is well known that a binary word of N bits in length is capable of directly addressing $2^N$ addressable devices. However, a matching address alone is not sufficient to address and activate a remote unit of the present invention. The significant thing, in this specific telecommunications application, is that the transmitted device address is clearly differentiated from live customer data by employing an address word with a bit length that is distinct from all customer data word bit lengths, and which furthermore is sent repetitively at a selected, timed regular interval, whereby a unique detectable sync pattern is provided. The 11-bit word length of the present invention can be readily discerned by a receiver since typical customer data on a T1 telecommunications line is always transmitted in words of even bit lengths which directly correspond to powers of two (8, 16, 32, 64, etc.). Furthermore, the unusual sync pattern of the 11-bit word of the present invention and a matching address must be detected continuously for a selected timed duration before the receiving remote loopback unit will recognize it as a activating address. As an additional requirement, the selected bit format of the 11-bit word of the present invention must comply with the industry standard one's density requirement, as previously described. Finally, the actual number of embedded address bits chosen must be adequate for the purposes of the present invention, which can address up to 64 devices on line. To one skilled in the art, it is apparent that the identical combination of functions could be alternately realized in variant embodiments, such as including the essential elements of the present invention within and as an integral part of a conventional telecommunication repeater unit. Additionally, since all remote loopback units are remotely addressed and activated, it is obvious that the testing process may be automated by timing and control unit 12 (FIG. 1A), as previously described; that is, all nodes or points along a network could be successively addressed and tested until the entire network has been tested. Furthermore, calls or other customer data could be automatically rerouted along alternate routes while such tests are in progress, as is routinely done within the telecommunications industry.

We claim:

1. A telecommunications network test system for the testing of at least one portion of a communications link between a first station and a selected second station, said link including a first transmission path (40) from said first station to said second station and a second transmission path (42) from said second station to said first station, comprising in combination:

at least one master test unit comprising:
  address means (24) for repetitively providing a selected 11-bit code, each code consisting of five constant bits and six loopback unit address bits forming address signals thereto,
  test data means (14) for providing a sequence of binary words as test data signals,
  reset means (34) for providing a binary reset signal,
  selection means (18) responsive to a selection signal and coupled to said address means (24), said reset means (34), and said test data means (14) for selectively providing as an output said address signals, said test data signals, or said reset signal, to said first path,
  signal receiving means (28) coupled to said second path (42) for receiving looped back signals,
  first digital comparison means (23) responsive to said receiving means (28) and said looped back signals and said 11-bit code for detecting a received selected 11-bit address code and responsively providing a selection signal coupled to said selection means (18) for providing as an output to said first path (40) said test data signals,
  second digital comparison means (20) responsive to said receiving means (28) and said looped back signals and said test data means for detecting bit errors,
  memory means (32) responsive to said second digital comparison means and coupled to said test data means and said looped back signals for storing bit error signals,
  calculation means (36) responsive to said memory means (32) for evaluating said bit error signals and providing as an output user data representing said signals, and
  display means (38) responsive to said calculation means (36) for displaying said user data;

at least one remote loopback unit located along said communications link, said unit being coupled to said first and second transmission paths comprising:
  first switching means (60, 64, T1-T6) interrupting said paths and having a first, second, third, fourth, fifth, and sixth terminals and control means responsive to a first signal state for connecting said first terminal to said third terminal and for connecting said fifth terminal to said sixth terminal and responsive to a second signal state for connecting said first terminal to said second terminal and for connecting said fifth terminal to said fourth terminal,
  said first terminal (T1) being connected through said first path from said first station, said second and sixth terminals being connected through said second path to said first station,
  said third and fourth terminals being connected through said first path to said second station, and
  said fifth terminal being connected through said second path to said second station;

storage means (52) for storing a six bit address uniquely associated with said remote loopback unit;

second switching means (58) coupled to said first station through said first transmission path and to said second station through said second transmission path for repeatedly switching, or polling, between said first transmission path from said first station and said second transmission path from said second station;

first detection means (46) responsive to said second switching means and an occurrence of an 11-bit word on either of said first or second transmission paths for providing said last named 11-bit word as an output;

second detection means (50) responsive to said first detection means and a selectively timed repetition of any binary word of 11 bits in length for providing as an output six selected bits of said binary word;

first digital comparison means (56) responsive to said storage means (52) and said second detection means (50) for providing a discrete output upon the detection of a matching six bit address code;

timing means (54) responsive to said discrete output of said first digital comparison means for timing the duration of said discrete output and providing a time out signal upon said duration persisting for a selected interval of time, said time out signal representing said second signal state and being coupled to said first switching means (60); and second digital comparison means (48) responsive to said second switching means (58) for detecting said reset signal and responsively providing said first signal state to said first switching means (60).

2. A system as set forth in claim 1 wherein said five constant bits of said 11-bit code are positioned in serial bit positions zero, one, two, three, and seven, and said six address bits are positioned in serial bit positions four, five, six, eight, nine, and ten, with said serial bit position zero being defined as the first bit transmitted in said 11-bit code.

3. A system as set forth in claim 2 wherein said five constant bits provide a minimum of N ones in each interval of 8(N+1) bits, wherein N may vary from 1 to 24.

4. A system as set forth in claim 1 wherein said test data means provides a bit error rate test sequence.

5. A system as set forth in claim 2 wherein said address means includes means for successively selecting discrete sets of said six address bits whereby loopback may be successively effected at selected said remote loopback units.

* * * * *